United States Patent [19]

Ekstrand

[11] Patent Number: 4,719,404
[45] Date of Patent: Jan. 12, 1988

[54] SWITCHED RESISTOR REGULATOR WITH LINEAR DISSIPATIVE REGULATOR

[75] Inventor: John P. Ekstrand, Palo Alto, Calif.

[73] Assignee: Spectra-Physics, Inc., San Jose, Calif.

[21] Appl. No.: 945,924

[22] Filed: Dec. 23, 1986

Related U.S. Application Data

[63] Continuation-in-part of Ser. No. 754,036, Jul. 11, 1985, Pat. No. 4,668,906.

[51] Int. Cl.$^4$ .............................................. G05F 1/656
[52] U.S. Cl. ..................................... 323/297; 323/224; 323/233; 323/268; 323/354
[58] Field of Search .................... 323/222, 224–225, 323/268–269, 272, 275, 297, 352–354; 363/86, 89

[56] References Cited

U.S. PATENT DOCUMENTS

| | | | |
|---|---|---|---|
| 1,892,215 | 12/1932 | Mathieu | 323/297 |
| 2,932,783 | 4/1960 | Mohler | 323/269 |
| 3,305,769 | 2/1967 | Julie | 323/354 |
| 4,290,007 | 9/1981 | Fisher et al. | 323/269 X |
| 4,305,651 | 12/1981 | Umezawa et al. | 323/354 X |

Primary Examiner—Peter S. Wong
Attorney, Agent, or Firm—Paul Davis

[57] ABSTRACT

A switched resistor regulator controls current flow through a resistor electrically connected to a load by varying the duty cycle of switching the resistor into electrical connection between of a power source and the load to regulate the power to the load. Both current and voltage regulation can be achieved. In a series switched configuration, current flow through a resistor in series with the load is controlled with current flow being maintained by a capacitor is parallel with the load when the resistor is switched off. In a shunt switched configuration current flow through a resistor in parallel with the load is controlled, with a capacitor parallel to the load also being used. In a hybrid configuration a shunt switched resistor is used while the current level to the load is changed by selecting one of several series resistors; a capacitor is also provided parallel to the load. In a switched resistor passbank configuration a series switched resistor is used with a capacitor connected in series with the load and parallel to the switched series resistor. A linear dissipative regulator is also connected between the supply and the load in parallel with the series resistance of the switched resistor regulator to reduce the minimum voltage drop to the load when the switching duty cycle reaches 100% for the series switched configurations or 0% for the shunt switched configurations.

20 Claims, 5 Drawing Figures

SWITCHED RESISTOR REGULATOR WITH LINEAR DISSIPATIVE REGULATOR

RELATED APPLICATIONS

This application is a continuation-in-part of application Ser. No. 754,036 filed July 11, 1985, now U.S. Pat. No. 4,668,906.

BACKGROUND OF THE INVENTION

The invention relates generally to power supplies and more specifically to regulated power supplies, particularly switching regulators.

One particular application for regulated power supplies is ion laser power supplies. The important factors are weight, speed, complexity, reliability and conducted emissions. Thus, a simple, inexpensive, compact and light weight design is particularly advantageous for use in an ion laser.

The following have been utilized in ion laser power supplies. A magnetic amplifier is reliable but heavy. A motor generator set is heavy and noisy. A carbon pile is erratic. A motor driven Variac has heavy brush problems. A buck boost transformer is heavy and requires manual tap changes. Phase controlled rectifiers include complex gate drive circuits and produce conducted emissions. Series pass transistors require many power semiconductors and are expensive to build. The standard switching regulator is efficient but includes expensive magnetics and complex snubbing. Thus, none of the available types of power supplies are ideal for an ion laser.

U.S. patent application Ser. No. 754,036 filed July 11, 1985, describes a dissipative switched resistor regulator in which current flow through a resistor electrically connected to a load is controlled by varying the duty cycle of switching the resistor into electrical connection between a power source and the load; the switching resistor may be in series or parallel to the load. However, since there is always a series resistance between the source and the load when the switch is closed (the switching resistor in the series regulator configurations), there is a high minimum voltage drop (when the series switch is closed all the time or the parallel switch is open all the time) across this series resistance, which results in poor efficiency since the full source voltage cannot be applied to the load. The problem cannot be solved merely by decreasing the series resistance since this results in increased peak currents which may exceed the capability of the switch in the regulator, and also in increased capacitor ripple currents.

Accordingly, it is an object of the invention to provide an improved switching regulator.

It is also an object of the invention to provide a regulated power supply for an ion laser.

It is another object of the invention to provide a regulated power supply which is simple, inexpensive, light weight and compact in design.

It is a further object of the invention to improve the switched resistor regulator by decreasing the minimum voltage drop to the load.

SUMMARY OF THE INVENTION

The invention is a switched resistor regulator. The average current flow through a fixed resistor is varied by switching the resistor in and out of the circuit, i.e., the duty cycle of the resistor is controlled. A power transistor is preferably used as the switch. Alternate preferred embodiments of the invention include: (1) a series switched resistor configuration in which the current flow through a resistor in series with the load is controlled while a capacitor in parallel with the load maintains load current while the resistor is switched off, (2) a shunt switched resistor configuration in which the current flow through a resistor connected in parallel across the load is controlled and having a resistor in series with the load; (3) a hybrid switched resistor configuration which combines a shunt switched resistor with selectable series resistors; and (4) a switched resistor passbank configuration having a series switched resistor with a capacitor connected across the series switched resistor. A dissipative linear regulator is provided in series between the source and the load and in parallel with the series resistor and controlled so that the minimum voltage drop across the series resistor is reduced as the duty cycle of the switch reaches 100% (switch closed all the time) for the series switch or as the duty cycle reaches 0% (switch open all the time) for the shunt switch.

The advantages of the invention over standard switching regulators include the small number of power components and the elimination of the need for snubbers (with resulting duty factor limitations) or a free wheeling diode. The invention embodiments are small size, low weight and flexible in configuration. Resistive switching is used which is easy to accomplish and does not adversely affect circuit operations; only the difference between supply and load voltage instead of full supply voltage appears across the switch (transistor) so there is low stress on the switch. The switching regulator can operate over a wide range of frequencies, including audible frequencies, since there is no inductor to produce noise. The invention may be operated from a 1-phase power source with a large L-C filter because it is not a negative resistance load. Low conducted emissions are produced by the regulator since in all configurations except the series switched resistor high frequency currents do not flow through the input filter capacitor. The invention also can dissipate a lot of power by putting losses into water using immersion heaters for the switched resistors and can be applied to higher power levels without increasing the number of components. The invention also reduces minimum regulator voltage drop.

DETAILED DESCRIPTION OF THE PREFERRED EMBODIMENTS

The invention is method and apparatus for regulating power from a supply means to a load by switching a resistive means in and out of electrical connection between the supply means and the load with a controlled duty cycle. The resistive means can be connected between the supply means and the load in different ways as will be further described with respect to the four alternate configurations shown in FIGS. 1-4. The regulator is primarily a current regulator since by switching the resistive means in and out of the circuit, the current to the load is controlled; voltage regulation can also result. A capacitor is also connected to the load, either parallel to the load or across a series switched resistor, to maintain current flow when the resistive means is switcned out of the circuit. Regulation is thus accomplished by controlling dissipation of power in the resistive means with a longer duty cycle providing more power dissipation in the resistive means; thus regulation is produced by introducing resistive losses into the circuit.

The invention also includes a linear dissipative regulator connected between the source and load in parallel to the series resistor of the switched resistor regulator. The linear dissipative regulator is controlled to decrease the voltage drop between the source and load when the switch is closed all the time (100% duty cycle) for the series switched configurations or open all the time (0% duty cycle) for the shunt switched configurations. Thus initially the series switched resistor regulator can provide regulation from the source to the load, with a low duty cycle providing a large voltage drop between the source and load and a high duty cycle providing a lower voltage drop between the source and load. However, at 100% duty cycle, when the switch is always closed, the switched resistor regulator is no longer regulating and the lowest voltage drop to the load is reached. The shunt switched reguailtor is the opposite. At low duty cycle, current draw is reduced until at 0% duty cycle the minimum regulator voltage drop to the load (across the series resistor) is reached. In order to further decrease the voltage drop to the load, the parallel linear dissipative regulator is then used. The parallel linear dissipative regulator reduces the voltage drop by shunting part of the current away from the series resistance of the switched resistor regulator and providing a parallel current path to the load, thus decreasing the voltage drop across the resistance and increasing the voltage to the load beyond that available from the switched resistor regulator alone.

Figure 1:
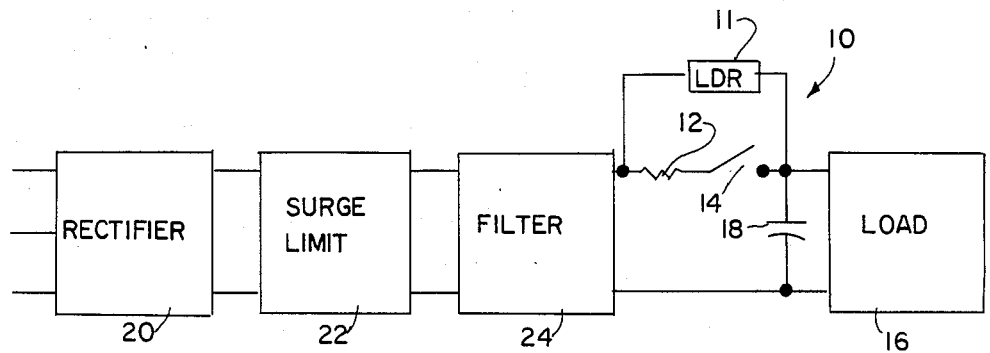
FIG. 1 is a schematic/block diagram of a series switched resistor regulator with linear dissipative regulator.

A series switched resistor regulator 10, as shown in FIG. 1, has a fixed resistor 12 connected through switch 14 to load 16 and to capacitor 18 which is connected in parallel across load 16. The input to resistor 12 may be produced by a variety of other circuits; as shown the input is a rectified filtered voltage formed by passing a source voltage through a rectifier 20, a surge limit circuit 22, and a filter 24 connected in series between the source voltage and resistor 12. The source voltage as shown is provided by a three-line input to rectifier 20, however, any other voltage supply means can be utilized. Filter 24 may be an R-C or L-C filter. In addition, a linear dissipative regulator (LDR) 11 is connected between the filter 24 and load 16 in parallel with series switched resistor regulator 10. The linear dissipative regulator 11 provides an alternate current path to the load which bypasses resistor 12 which creates the primary voltage drop to the load.

The regulator 10 operates by opening and closing switch 14 repetitively; the switching frequency is constant while the duty cycle of switch 14 is controlled to vary the current through the resistor 12 to maintain a constant current or voltage to load 16. The switching frequency is sufficiently high so that capacitor 18 remains sufficiently charged to provide a voltage across load 16 when switch 14 is open to maintain current flow to the load. The switcn 14 is closed to change the current to load 16. When the duty cycle of switch 14 reaches 100% the switch is always closed and no further regulation takes place. The resistance to the load is at its minimum value (equal to resistor 12) and the voltage drop is also at its minimum. However, this voltage drop prevents the full source voltagefrom being applied to the load. The voltage drop will be lower for lower values of resistor 12 but this may increase current flow through resistor 12 to a value too high for switch 14. Thus LDR 11 can be used to shunt current to the load without passing through resistor 12, thereby decreasing the voltage drop. The LDR 11 is controlled to operate as the duty cycle of switch 14 reaches 100%.

The series switched resistor regulator 10 provides constant input line current for varying input line voltage. However, high peak switching currents may occur, depending on the input line voltage range and the ratio of resistance 12 to the resistance of load 16. The switch 14 should have a current capability of approximately 2-4 times the load current. Peak currents may produce some ripple in capacitor 18. Multiphase switching operation is more effective than single phase switching, i.e. multiple switched resistors driven out of phase to increase ripple frequency and reduce ripple current in the capacitor.

Figure 2:
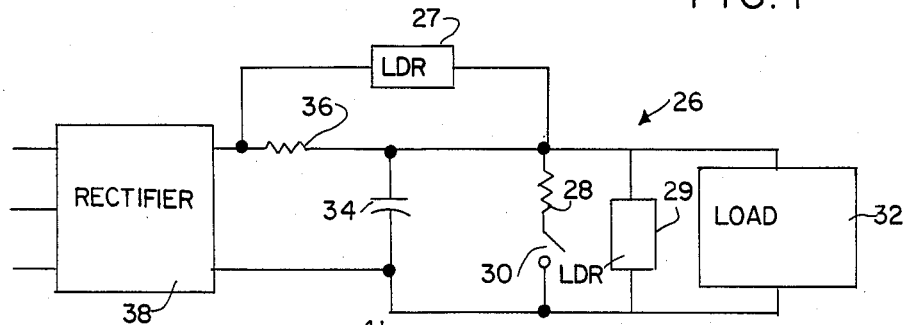
FIG. 2 is a schematic/block diagram of a shunt switched resistor regulator with linear dissipative regulator.

A shunt switched resistor regulator 26, as shown in FIG. 2, has a fixed resistor 28 and series switch 30 connected in parallel across load 32. Also connected across load 32 and across resistor 28 and switch 30 is a capacitor 34. An input voltage is passed through rectifier 38 and the rectified signal is passed through a fixed resistor 36 which is connected in series with the load; resistor 36 is also connected in series with resistor 28 and switch 30 and also with capacitor 34. Regulator 26 operates by repetitively opening and closing switch 30 to add or remove resistor 28 from the circuit. When resistor 28 is removed from the circuit (switch 30 open) more current flows to load 32; when resistor 28 is connected to the circuit (switch 30 closed) current is divided between resistor 28 and load 32, depending on the relative values of the resistances, so less current flows to load 32. The duty cycle of switch 30 is controlled to provide proper regulation of the current and voltage to load 32. Resistor 36 is always in series with load 32 to limit the maximum current to the load 32. Capacitor 34 remains sufficiently charged to maintain a voltage across the load 32. Capacitor 34 and resistor 36 form an R-C filter to filter the rectified signal from rectifier 38. In addition a linear dissipative regulator (LDR) 27 is connected between rectifier 38 and load 32 in parallel with series resistor 36. LDR 27 is again controlled to decrease the minimum voltage drop across resistor 36 by shunting part of the current.

In the shunt switched resistor regulator 26, peak switching capability is approximately half the operating current for fixed current operation. No L-C filter or surge limiting is required as in the series switched regulator, and lower conducted emissions are produced. However, the efficiency of the shunt switched resistor regulator is lower than the series switched regulator particularly for wide current control range and input line current changes with input line voltage.

Figure 3:
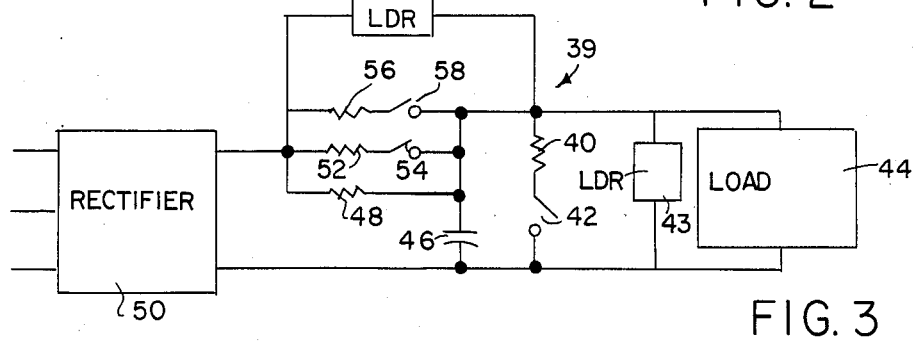
FIG. 3 is a schematic/block diagram of a hybrid switched resistor regulator with linear dissipative regulator.

A hybrid switched resistor regulator 39, as shown in FIG. 3, combines a shunt switched resistor with selectable series resistors. A shunt resistor 40 and series switch 42 are connected across load 44. Capacitor 46 is also connected in parallel with the load 44 and with resistor 40 and switch 42. Load 44 is connected through series resistor 48 to rectifier 50 which supplies a rectified voltage signal to the load 44. A first series resistor 52 and its series switch 54 are connected in series between rectifier 50 and load 44, parallel to resistor 48. A second series resistor 56 and its series switch 58 are also connected in series between rectifier 50 and load 44 also parallel to resistor 48. The purpose of the first and second series switched resistors 52, 56 is to select the current level. In operation, resistor 40 is switched in and out of the circuit, as a shunt switched regulator, to provide desired voltage regulation to load 44. The switching duty cycle of the switch 42 is controlled. The series resistors 52, 56 are used, in combination with resistor 48, to select the current level and to get within range of the shunt regulator in which shunt resistor 40 is switched rapidly (at a high frequency) to remove ripple and noise. By adding either or both of resistors 52, 54 in parallel to resistor 48, the total resistance is decreased so the input current level is increased. Switches 54 and 58 are not the same type of switches as switch 42 since their functions are totally different; switch 42 is used for rapid switching of resistor 40 with controlled duty cycle to provide regulation while switches 54, 58 are only used to change the total series resistance to the load. By switching the series resistors 52, 56 only when necessary to change current level, conducted emissions and capacitor ripple problems are reduced and the filter and surge limiting circuit are eliminated. Input line current would remain more constant. The capacitor 46 remains substantially charged during the switching and forms with resistor 48 an R-C filter between rectifier 50 and load 44. A linear dissipative regulator (LDR) 41 is also connected between rectifier 50 and load 44 in parallel with resistors 48, 52, 56.

Figure 4:
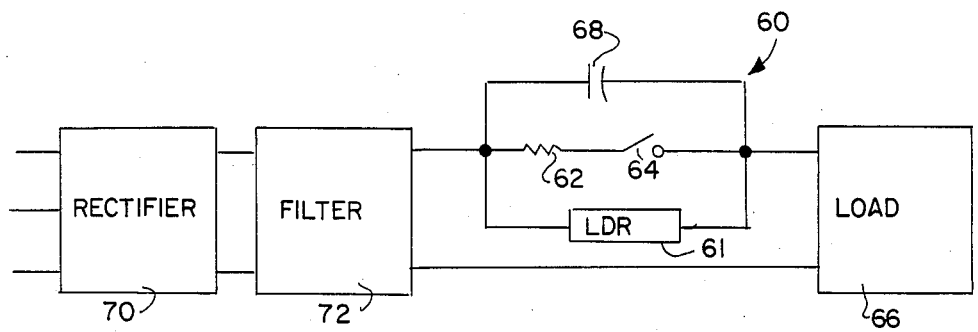
FIG. 4 is a schematic/block diagram of a switched resistor passbank regulator with linear dissipative regulator.

A switched resistor passbank regulator 60, as shown in FIG. 4, utilizes a resistor 62 and switch 64 connected in series with load 66. Capacitor 68 is connected across the resistor 62 and switch 64 and functions to maintain current flow through load 66 when switch 64 is open. The input to resistor 62 is provided by any power supply means and conditioned by any additional circuits as desired, e.g., a rectified filtered voltage formed by passing a source voltage through a rectifier 70 and a filter 72 connected in series between an input line and resistor 62. Filter 72 may be an L-C or R-C filter. In operation the duty cycle of switch 64 is controlled to vary the current through resistor 62 to regulate the current and voltage to load 66. Capacitor 68 maintains current flow to the load 66 when switch 64 is open. Since capacitor 68 is in series with load 66 a lower voltage capacitor can be used than the parallel capacitor used in the series switched regulator; only the difference between source and load voltage appears across capacitor 68. The passbank configuration also produces low conducted emissions and constant line current since switched resistor current does not go back to the source, but provides no ripple rejection. A linear dissipative regulator (LDR) 61 is also connected between filter 72 and load 66 in parallel with switched resistor passbank regulator 60 to decrease the minimum voltage drop to the load when switch 64 is in a constant closed position.

Although various types of switches can be utilized, the switches 14, 30, 42, and 64 are preferably power transistors, either bipolar or MOS. Gate turnoff thyristors could also be used, as well as SCR's or even electro-mechanical switches such as brushes. The switches are operated at constant frequency and the duty cycle is controlled from 0-100%. The switch is preferably operated at a frequency that produces low losses; a typical frequency is 20 kHz. The power transistors are switched on and off by conventional control circuitry providing a pulse width modulated input to the base of the transistor, as is further illustrated by the circuit of FIG. 5. The control circuitry may be implemented with integrated circuits.

The linear dissipative regulators may be bipolar transistors, MOSFETs, vacuum tubes, carbon piles or other devices which can form a current shunt. The function of the LDR is to reduce the voltage drop to the load when the switched resistor regulator (SRR) reaches the appropriate end (high or low) of its duty cycle range. For the series SRR configurations of FIGS. 1 and 4 the LDR comes into operation as the switch duty cycle reaches its upper limit (100%) when the switch is constantly closed, while for the shunt SRR configurations of FIGS. 2 and 3 the LDR comes into operation as the switch duty cycle reaches its lower limit (0%) when the switch is constantly open.

In addition the shunt SRR configurations of FIGS. 2 and 3 may also include a second LDR 29, 43 respectively, connected in parallel across the load to provide zero voltage drop across the load. (This same function may be performed in the series SRR configurations of FIGS. 1 and 4 merely by opening the switch.)

Although the invention can be used in power supplies for many applications, the switched resistor regulators are particularly useful for nearly constant voltage loads, e.g., discharge or arc lamps or laser tubes. Thus, the invention can be utilized in a power supply for lasers, specifically ion lasers or YAG lasers. In a switched resistor regulator power supply for ion lasers, immersion heaters may be used as the resistors in order to dissipate a lot of heat, which may be removed by water cooling, and motor control transistors for the switches.

Figure 5:
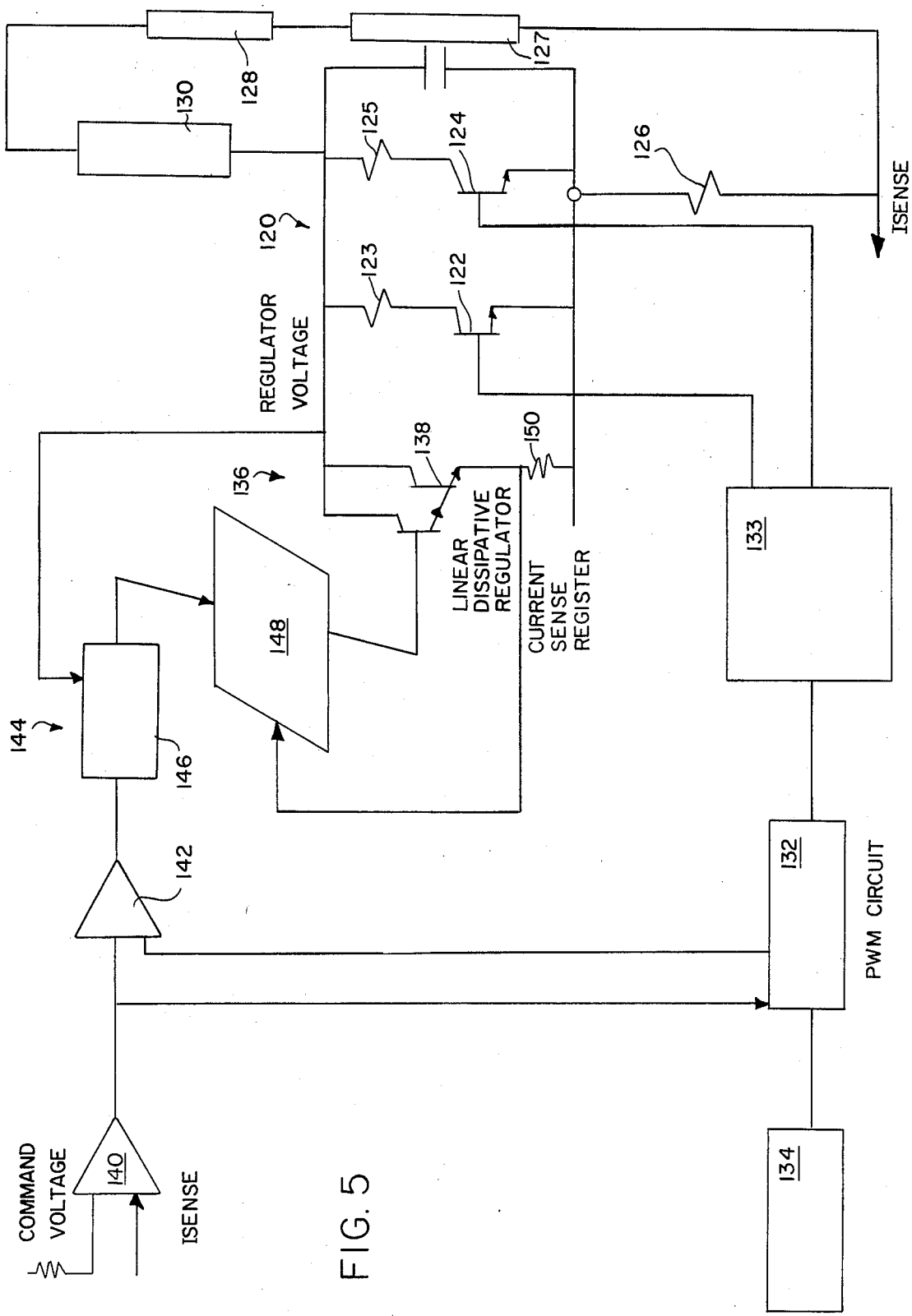
FIG. 5 is a schematic of a passbank switched resistor regulator with linear dissipative regulator for an ion laser power supply.

An embodiment of a passbank switched resistor regulator with linear dissipative regulator is illustrated in FIG. 5. The basic configuration and operation of the switched resistor regulator is described in U.S. patent application Ser. No. 754,036 filed July 11, 1985, which is herein incorporated reference; the following description shows how the linear dissipative regulator is added to such a circuit. A passbank switched regulator 120 includes a pair of transistors 122, 124 which are the switches connected at their collectors to a pair of switching resistors 123, 125; a pair of switches are used in place of a single switch for multiphase switching regulation. The emitters are connected through current sensing resistor 126 to DC voltage source 127 which is connected through start circuit 128 and load 130, e.g. a laser tube, back to switching resistors 123, 125 to complete the circuit. The switching resistors are driven by base drive circuit 133 connected to the bases of transistors 122, 124. Drive circuit 133 is controlled by a pulse width modulation (PWM) circuit 132 which is powered by a floating low voltage control supply 134. A linear dissipative regulator 136 is connected between the supply 127 and load 130 in parallel with switched resistor regulator 120, and is formed of a transistor (Darlington package) 138. A control circuit 144 is connected to the base of transistor 138. Load current is measured at resistor 126 and compared with a set value in difference amplifier 140. The error signal output from amplifier 140 is input to PWM circuit 132 as a control signal and also compared with a ramp peak voltage signal from PWM circuit 132 in difference amplifier 142. The signal from PWM circuit 132 indicates when the end of the range of PWM circuit 132 is reached. The output from amplifier 142 is input into dissipation limiter circuit 146 along with a regulator voltage signal to determine if the rating of transistor 138 will be exceeded. The output of limiter circuit 146 is input to LDR current regulator 148 along with a current signal from LDR 136 measured at sensing resistor 150. LDR current regulator 148 is connected to the base of transistor 138 to actuate the linear dissipative regulator 136 and control the amount of current flow through LDR 136.

Changes and modifications in the specifically described embodiments can be carried out without departing from the scope of the invention which is intended to be limited only by the scope of the appended claims.

I claim:

1. Apparatus for regulating power from a power supply means to a load comprising:
   (a) a switching resistor regulator, comprising:
   resistive means and capacitive means electrically connected between the power supply means and the load, the resistive means including at least a switching resistor;
   switching means connected in series with the switching resistor for opening and closing the electrical connection through the switching resistor in the resistive means from the supply means to the load, the resistive means having a resistor in series between the supply means and the load when the switching means is closed, the capacitive means having a capacitor electrically connected to the load when the switching means is open;
   control means connected to the switching means for opening and closing the switching means at a frequency and duty cycle to selectably vary average current flow through the switching resistor to regulate current flow to the load; and
   (b) a linear dissipative regulator connected between the the supply means and the load in parallel with the resistor in series between the supply means and the load to provide a current shunt path between the supply and the load.

2. Apparatus of claim 1 wherein the switching resistor is connected in series between the power supply means and the load.

3. Apparatus of claim 1 wherein the switching resistor is connected in parallel to the load and a current limiting resistor is connected in series between the supply means and the load.

4. Apparatus of claim 1 wherein the resistive means comprises a plurality of separate switching resistors connected in parallel and the switching means switches each separate switching resistor out of phase with the others.

5. Apparatus of claim 1 further including actuation means connected to the control means for detecting when the duty cycle reaches its limit and for actuating the linear dissipative regulator.

6. Apparatus of claim 1 wherein the linear dissipative regulator is selected from bipolar transistors, field effect transistors, vacuum tubes, and carbon piles.

7. Apparatus of claim 2 wherein the linear dissipative regulator is actuated as the duty cycle of the switching means approaches 100%.

8. Apparatus of claim 3 wherein the linear dissipative regulator is actuated as the duty cycle of the switching means approaches 0%.

9. Apparatus comprising:
   (a) unregulated power supply means;
   (b) a load electrically connected to the power supply means;
   (c) a switching resistor regulator, comprising:
   resistive means and capacitive means electrically connected between the power supply means and the load, the resistive means including at least a switching resistor;
   switching means connected in series with the switching resistor for opening and closing the electrical connection through the switching resistor in the resistive means from the supply means to the load, the resistive means having a resistor in series between the supply means and the load when the switching means is closed, the capacitive means having a capacitor electrically connected to the load when the switching means is open;
   control means connected to the switching means for opening and closing the switching means at a frequency and duty cycle to selectably vary average current flow through the switching resistor to regulate current flow to the load; and
   (d) a linear dissipative regulator connected between the supply means and the load in parallel with the resistor in series witbetween the supply means and the load to provide a current shunt path between the supply and the load.

10. Apparatus of claim 9 wherein the load is a laser tube, a discharge tube, or an arc lamp.

11. Apparatus of claim 9 wherein the switching resistor is connected in series between the power supply means and the load.

12. Apparatus of claim 9 wherein the switching resistor is connected in parallel to the load and a current limiting resistor is connected in series between the supply means and the load.

13. Apparatus of claim 9 wherein the resistive means comprises a plurality of separate switching resistors connected in parallel and the switching means switches each separate switching resistor out of phase with the others.

14. Apparatus of claim 9 further including actuation means connected to the control means for detecting when the duty cycle reaches its limit and for actuating the linear dissipative regulator.

15. Apparatus of claim 9 wherein the linear dissipative regulator is selected from bipolar transistors, field effect transistors, vacuum tubes, and carbon piles.

16. Apparatus of claim 11 wherein the linear dissipative regulator is actuated as the duty cycle of the switching means approaches 100%.

17. Apparatus of claim 12 wherein the linear dissipative regulator is actuated as the duty cycle of the switching means approaches 0%.

18. Method for regulating power to a load, comprising:

supplying an unregulated voltage;

applying the unregulated voltage to a resistive means including a switching resistor connected to the load;

switching the switching resistor in and out of electrical connection to the load at a frequency and duty cycle sufficient to maintain a substantially regulated current in the load;

providing a capacitive means in electrical connection to the load when the switching resistor is switched out of electrical connection to the load;

providing a resistor in series with the load when the switching resistor is in electrical connection to the load;

providing a current shunt path from the unregulated voltage to the load in parallel to the resistor in series with the load.

19. Method of claim 18 further including connecting the switching resistor in series with the load providing the shunt current path to the load as the switching duty cycle approaches 100%.

20. Method of claim 18 further including connecting the switching resistor in parallel across the load, connecting a current limiting resistive means in series with the load, and providing the current shunt path to the load as the switching duty cycle approaches 0%.

* * * * *